April 21, 1970   M. W. CLAUNCH ET AL   3,507,055
MISSILE TRACKING SIMULATOR
Filed Jan. 10, 1968

INVENTORS.
M. WAYNE CLAUNCH
WILLIAM A. ARRIOLA
EPHRAIM REGELSON
BY
ROY MILLER
ATTORNEY.

United States Patent Office 3,507,055
Patented Apr. 21, 1970

---

3,507,055
MISSILE TRACKING SIMULATOR
M Wayne Claunch, William A. Arriola, and Ephraim Regelson, China Lake, Calif., assignors to the United States of America as represented by the Secretary of the Navy
Filed Jan. 10, 1968, Ser. No. 696,731
Int. Cl. G09b 9/00; F41g 3/26
U.S. Cl. 35—25     4 Claims

ABSTRACT OF THE DISCLOSURE

A means for simulating missile tracking comprising a pinlight mounted along the optical axis at the most forward tracking element of a missile seeker unit, and associated optics capable of superimposing the pinlight image on the image of a target being tracked for recording on film or visual observation.

BACKGROUND OF THE INVENTION

In testing and evaluating gyro stabilized optically guided missiles it is desired that it be known in which direction the "eye" of the missile is looking at any one time.

When evaluating a television guided missile, for instance, it is possible to view the video output from the vidicon to determine in what direction the missile is looking. Infrared signature measurements can be made by using a spectral radiometer, however, present radiometers do not have the range and sensitivity of the missile seekers and they do not permit use of the missile in its environment, i.e. captive flight. Radar guided missiles, for instance, pose a problem of air point evaluation which can not be solved by either of the above described methods.

It is desirable therefore to design one system which is capable of disclosing whether or not a missile seeker system is pointing directly at its target.

SUMMARY

In accordance with the present invention a pinlight powered through coils in the missile head, or batteries installed on the missile seeker gyro, projects the line of sight of the missile. The image of the pinlight passes through a pentaprism, then through an opening in the center of a mirror where it is directed to a second mirror. Simultaneously, the image of the tracked unit is reflected from the first mirror with the center opening onto the second mirror.

These two images are combined through the use of camera optics and appear superimposed upon one another as visible images in a reflex viewer, on motion picture film, or on the vidicon of a television system.

DESCRIPTION OF THE PREFERRED EMBODIMENT

Figure 1:
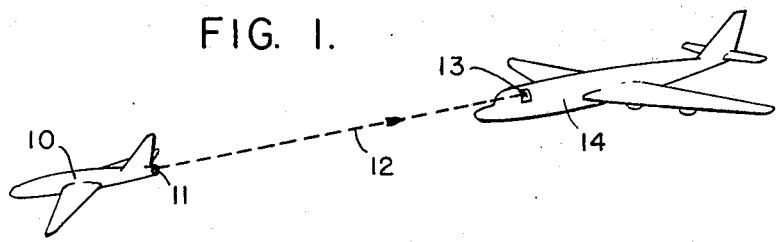
FIG. 1 is a diagrammatic view of the tracking simulator operating in its environment.

FIG. 1 illustrates a target plane 10 with target 11, which may be the exhaust of a jet or the like, being tracked by tracking simulator 13 which is mounted on a second aircraft 14. As target plane 10 is caused to go through maneuvers to evade the missile housed within tracking simulator 13, optical path 12 provides the missile with the information to track the target 11.

Figure 2:
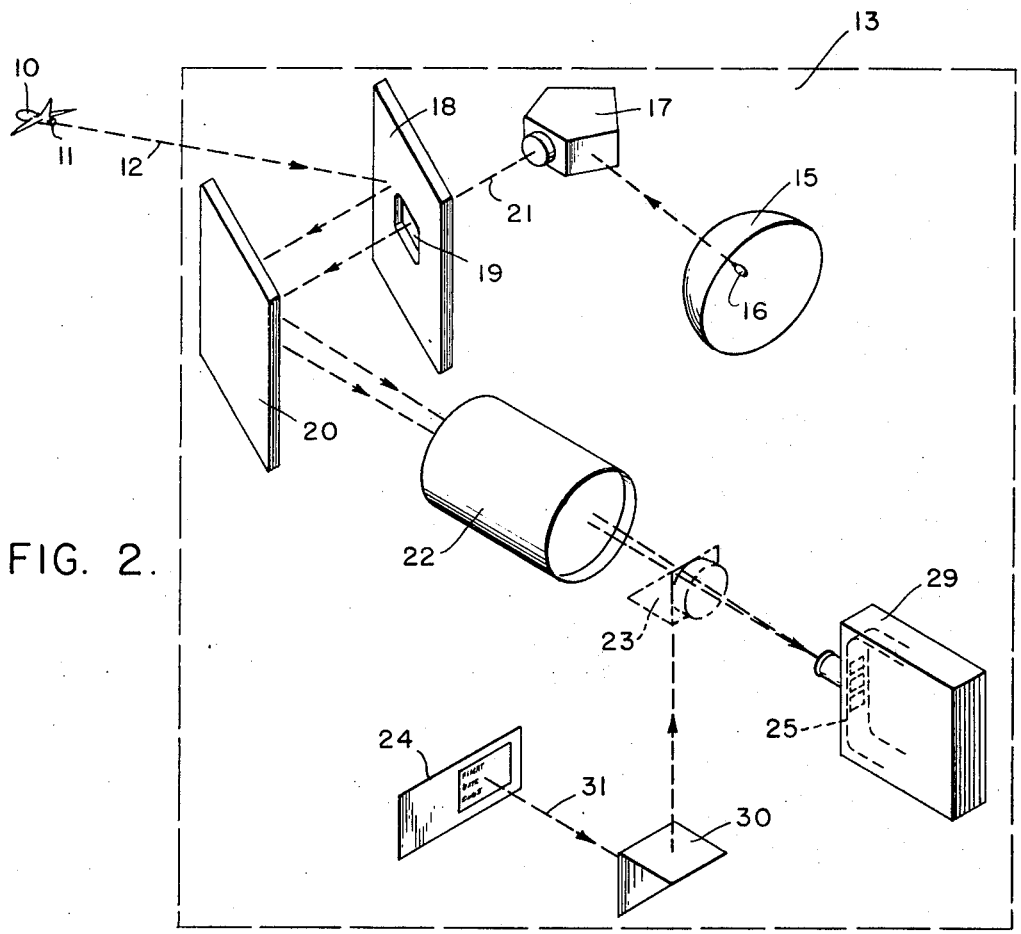
FIG. 2 is a diagrammatic view of a preferred embodiment of the system.

FIG. 2 shows a preferred embodiment of the invention. Pinlight 16 is mounted on the most forward tracking element of missile seeker unit 15. The light emanating from pinlight 16 is folded 90 degrees by pentaprism 17 and then it passes through a first mirror 18 via opening 19. Mirror 18 may be fully silvered, except for the area 19 through which light beam 21 passes, or mirror 18 may be treated to reflect light ray 12 and transmit light ray 19. The light beam 21 reflects off the second mirror 20 and is passed through lens 22 (prism 23 is folded out of the way) and then to camera 29 where the image is recorded on movie film 25.

The ray of light 12 which is received from target 11, which is located on target plane 10, reflects off mirror 18 and then onto the second mirror 20 where it is further reflected into lens 22 where it is combined with the ray 21 emanating from the pinlight 16. Provision is made for titling via aperture card 24. Ray 31 emanating from the aperture card is reflected by prism 30 onto prism 23, which is moved up into position for titling, and into movie camera 29 where the information recorded on aperture card 24 is impressed on movie film 25.

Figure 3:
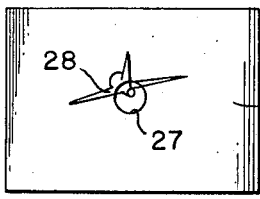
FIG. 3 is a view through the camera optics of the system.

A viewer looking through the lens on camera 29 would see the image 26 as shown in FIG. 3. The view 26 shows the image of the target plane 28 superimposed upon the light 27 which emanates from pinlight 16 which is located on the missile seeker unit 15.

To aid in distinguishing the image of the target 28 from the image 27 of the pinlight 16, the pinlight 16 may be a red bulb, or a red filter may be placed in front of the pentaprism 17.

Various modifications are contemplated and may obviously be resorted to by those skilled in the art without departing from the spirit and scope of the invention, as hereinafter defined by the appended claims, as only a preferred embodiment of the invention has been disclosed.

GOVERNMENT INTEREST

The invention described herein may be manufactured and used by or for the Government of the United States of America for governmental purposes without the payment of any royalties thereon or therefor.

What is claimed is:
1. A missile tracking simulation system comprising;
   a seeker unit of a guided missile;
   a pinlight producing means mounted on the optical axis of said seeker for producing a light beam centered about said optical axis;
   a remote target having a distinct image;
   optical means for combining and superimposing the image of the remote target with the beam from the pinlight;
   said means for combining and superimposing comprises a fully silvered semitransparent mirror with an aperture therein;
   said image of said target being reflected from a first side of said mirror;
   means for directing the pinlight beam through said aperture to emerge from said first side of the mirror; and
   means for combining the target image and pinlight beam for viewing.
2. The system of claim 1 wherein the means for superimposing said images comprises:
   a fully reflective mirror to direct the image of the remote target and the pinlight beam from said semitransparent mirror onto a lens;
   a converging lens to combine said images; and
   viewing means for examining the images combined by said lens.
3. The system of claim 2 wherein said viewing means is a movie camera.

4. The system of claim 3 wherein means for titling said images received by the movie camera is provided.

References Cited

UNITED STATES PATENTS 2,479,262 8/1949 Richards _____ 356—251
2,884,829 5/1959 Davies et al. _____ 356—29

FOREIGN PATENTS 1,489,865 6/1967 France.

EUGENE R. CAPOZIO, Primary Examiner
P. V. WILLIAMS, Assistant Examiner

U.S. Cl. X.R.

350—174; 356—251